June 4, 1935.   R. SCHERF   2,004,082
HOSE COUPLING
Filed March 16, 1934
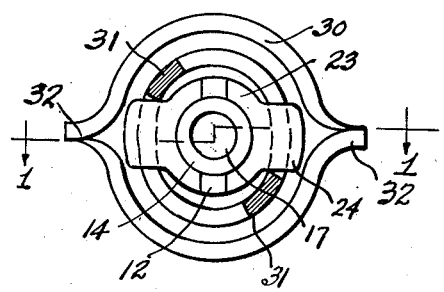
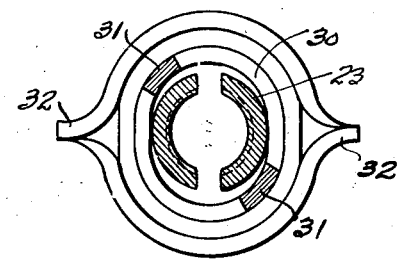
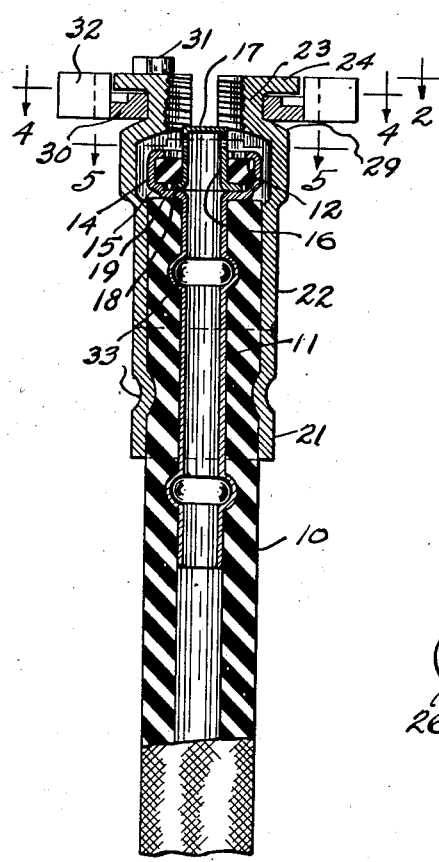
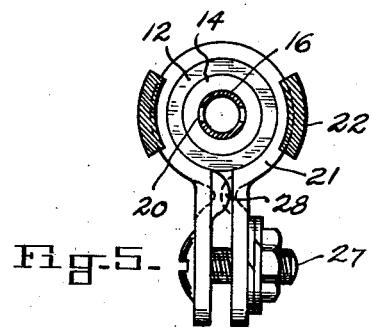
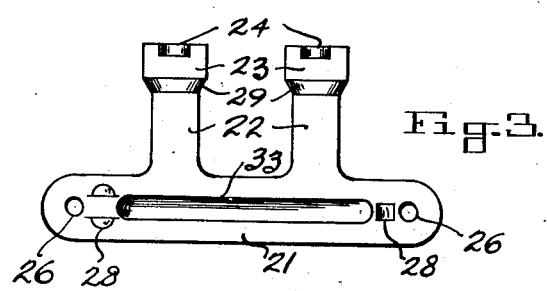

Patented June 4, 1935

2,004,082

UNITED STATES PATENT OFFICE 2,004,082

HOSE COUPLING

Rudolph Scherf, Detroit, Mich.

Application March 16, 1934, Serial No. 715,856

4 Claims. (Cl. 284—17)

This invention relates to hose couplings and to hoses provided with novel hose couplings, and aims to provide hose couplings and hoses provided with couplings, particularly adapted for provision as standard equipment on automobiles, replacing the bicycle pumps now provided.

As every automobile driver has discovered, to his sorrow, it often happens that a tire goes "flat". Under such circumstances, the driver of the automobile has at his choice one of three alternatives; he can drive on the "flat" to the nearest repair shop and there have the flat tire repaired; he can pump it up himself on the road with the ordinary bicycle pump that is furnished as standard equipment on most automobiles, and then drive to a repair shop; or he can replace the flat tire with the spare tire that is generally carried. Not one of these alternatives is pleasant to contemplate, and this invention has for its principal object the provision of a means which furnishes to the driver another alternative, one which is more satisfactory than any of the three aforementioned.

The invention provides a long flexible hose which may be carried in the car and which at its ends is provided with couplings; this hose may be used to connect the flat tire to one or more of the three remaining driving tires or to the spare, so that the flat tire may be partially pumped up by air under pressure from anyone or more of the three driving tires that are not flat, or from the spare. When using such a hose, enough air is drawn from the tire or tires under pressure to pump up the flat tire temporarily to a sufficient pressure to enable the driver to drive to the nearest repair station, where tires may be repaired, changed or pumped up to a satisfactory degree, without difficulty.

In order to make the invention commercially useful, it is necessary to provide a long hose in every vehicle, and to provide on the end of this hose satisfactory couplings by means of which quick coupling of the hose ends to the tire valve nipples may be effected and a further object of this invention is to provide a novel form of hose coupling, one which can be used to couple a hose end to a conventional tire valve nipple very quickly and easily. Viewed in this aspect, it can be seen that the invention is not limited to automobile use, but that other uses of couplings of the invention are contemplated.

Other objects of the invention will presently be understood upon reference to the following detailed description of the embodiment shown in the appended drawing. In this drawing;—

Fig. 1 is a cross sectional view of a hose end provided with a novel coupling, and is taken on line 1—1 of Fig. 2;

Fig. 2 is a top plan section view of the coupling of Fig. 1;

Fig. 3 shows a blank from which an important part of the coupling is fashioned;

Figs. 4 and 5 are sections as if on lines 4—4 and 5—5, Fig. 1.

Referring to the drawing, it will be seen that there is shown at 10 a flexible hose on whose end is provided a novel coupling of the invention. Tightly disposed within the hose end is a tubular metallic insert 11 which has an enlarged end turned over as at 12 to clamp a flat rubber gasket 14 in place on a shoulder 15 of the insert 11. Telescoped within the enlarged end of the insert 11 and tightly held therewithin by the gasket is a depressor 16, in the form of a thimble, and having an upwardly extending valve stem depressor head 17 which projects upwardly through a central hole of the gasket, the depressor having a flange 18 which seats under the gasket 14, in a terrace 19 of the insert 11. A relatively tight fit for all of the parts is assured by the dimensioning of the parts. Immediately below the head 17 are holes 20 which communicate the interior of the hose with the space above the gasket 14.

Disposed outside of the hose and tightly fitted thereon is an adjustable hose clamp 21 having upwardly extending resilient clamping arms 22 which are integral with the clamp 21 and which at their upper ends are formed with threaded clamping jaws 23 for cooperation with the threaded valve nipples usually provided on tires. The upper ends of the jaws 23 are provided with bent lugs 24 which are central of the threaded jaws 23, for purposes later to be described; and the clamp 21 is apertured at 26 to receive a bolt 27 which tightens the clamp on the hose, and is formed with alining lugs 28 for mutual cooperation. The clamp 21, arms 22, jaws 23, and lugs 24 are formed from the blank of Fig. 3.

Journalled on tapered shoulders 29 of the clamping arms 22 and surrounding the clamping jaws 23 is an oval or non-circular clamping ring 30 of U-cross section, having upwardly projecting lugs 31 adapted to abut the lugs 24 of the clamping jaws 23, and this clamping ring is provided with wings or handles 32 by means of which the clamping ring may be rotated.

It will be observed that the clamping ring is oval or non-circular, as shown in Figs. 2 and 4. Because of this, when the clamping ring is in the position of Fig. 2, with its lugs 31 engaging the lugs 24 of the jaws 23, the clamping ring will urge the arms 22 towards each other, and cause the coupling on the end of a hose to grip tightly a valve nipple between the jaws. However, when the clamping ring is rotated a quarter turn clockwise, Fig. 2, from the position it is shown as occupying, so that its lugs 31 engage the other sides of lugs 24, the ring will permit the clamping jaws 23 to spring away from each other, and permit the coupling to be applied to or readily removed from the valve nipple.

It will be observed that the insert 11 and clamp 21 are formed with beads 33 by means of which a tight fit between these inserts and the hose 10 is effected.

The use of a hose provided at each end with fittings of the character disclosed can readily be seen. When a tire goes flat, the operator merely connects the valve nipple of that tire to the valve nipple of one of the other driving tires or to the valve nipple of the spare tire and permits air from one or more of the driving tires or from the spare tire to flow into the flat tire to an extent sufficient to warrant the driver continuing to drive on the flat which has now been pumped up to some extent, to a repair station. Thereafter, he may have the tire repaired.

Now having described an embodiment of the invention, reference will be had to the following claims to determine the scope of the invention.

I claim:

1. For coupling a hose end to a valve nipple having a valve therein provided with an exposed stem, a hose coupling including a gasket fixedly seated on and partially closing said end and provided with a central aperture, an insert fixed within said hose end and having a valve stem depressor portion projecting upwardly through said gasket aperture, and provided with a solid head and side openings above the base of the gasket which communicate the interior of the hose with the space above the gasket, a member encircling the hose and having integrally formed, upwardly extending, elongated resilient arms formed at their free ends with clamping jaws adapted to embrace the valve nipple between them when urged towards each other, and formed to have a tendency to separate to an extent sufficient to permit the jaws readily to receive a valve nipple between them, and a non-circular clamping ring disposed outside of the jaws and journalled on the arms and manually rotatable to urge the jaws towards each other to clamp a valve nipple between them or to permit the jaws to separate.

2. For coupling a hose end to a threaded valve nipple having a valve therein provided with an exposed stem, a hose coupling including a gasket fixedly seated on and partially closing said end and provided with a central aperture, an insert fixed within said hose end and having a valve stem depressor portion projecting upwardly through said gasket aperture, and provided with a solid head and side openings above the base of the gasket which communicate the interior of the hose with the space above the gasket, a member encircling the hose and having integrally formed, upwardly extending, elongated resilient arms formed at their free ends with threaded clamping jaws adapted to embrace the threaded valve nipple between them when urged towards each other, and formed to have a tendency to separate to an extent sufficient to permit the jaws readily to receive a valve nipple between them, and a non-circular clamping ring disposed outside of the jaws and journalled on the arms and manually rotatable to urge the jaws towards each other to clamp the threaded valve nipple between them or to permit the jaws to separate.

3. A construction of the character described in claim 1 wherein the insert is in the form of a flanged thimble with its flange disposed and clamped between the base of the gasket and the end of the hose.

4. A construction of the character described in claim 2 wherein the insert is in the form of a flanged thimble with its flange disposed and clamped between the base of the gasket and the end of the hose.

RUDOLPH SCHERF.